May 1, 1928. 1,667,754
Y. VAN MALDERGHEM
BALANCED CHASSIS WITH INDEPENDENT SUSPENSION FOR
AUTOMOBILE VEHICLES AND THE LIKE
Filed April 7, 1926

Inventor
Y. Van Molderghem
By Marks & Clerk
Attys.

Patented May 1, 1928.

1,667,754

UNITED STATES PATENT OFFICE.

YVON VAN MALDERGHEM, OF LA LOUVIERE, BELGIUM.

BALANCED CHASSIS WITH INDEPENDENT SUSPENSION FOR AUTOMOBILE VEHICLES AND THE LIKE.

Application filed April 7, 1926, Serial No. 100,402, and in Belgium April 8, 1925.

The present invention has for its subject an improved chassis giving an economical and perfect suspension of vehicles.

The accompanying drawing illustrates an embodiment of the invention simply by way of example, the principle being subject to modifications as regards the details, according to the mechanical application.

In the four figures the same reference numerals relate to the same parts.

Figure 1:
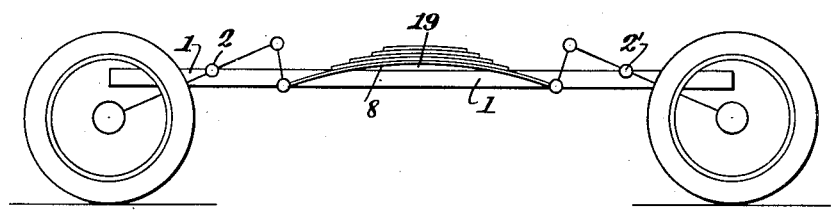
Figure 1 is an elevation of a vehicle chassis to which the invention is applied.

The characteristic feature of the invention is the independent suspension by a central spring or any other.

To the chassis 1 of the vehicle, the suspension of which it is desired to improve, by rendering it independent at the points 2 and 2', are provided bearings (if necessary with ball bearings) supporting the axle rods 3, 3', 3" and 3'" at the ends of which are mounted the wheels 4, 4', 4" and 4'".

At the ends 5, 5', 5" and 5'" of the said axle rods are mounted the swing bars 6 and 6' pivoting upon the two half shafts 7 and 7' of a central spring 8 secured to the chassis.

Figure 2:
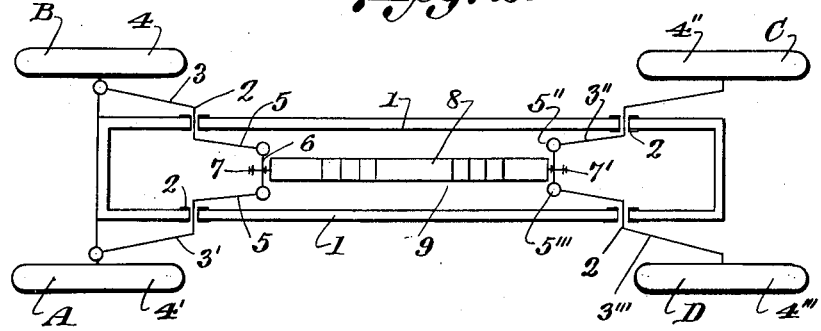
Figure 2 is a plan view of the chassis.
Figure 3:
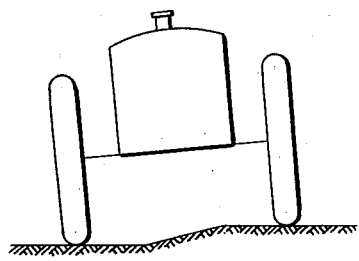
Figure 3 is a front view of a vehicle which is out of balance.
Figure 4:
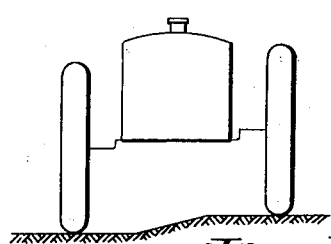
Figure 4 is a front view of a balanced or compensated vehicle.

The arrangement functions in the following way:

If the vessel A (Fig. 2) is raised by any obstacle encountered on the road, since it is fixed to the axle rod 3', it is raised and through the medium of the pivotal point 2 it compels the end 5' to make a movement in the opposite direction, that is to say to move downwards.

The downward movement of the end of the axle rod 3' is impressed upon the swing bar 6 which transmits it to the end 5' of the axle rod 3, but this movement is restrained or absorbed by the elasticity of the central spring 8; in this way the shock received by the wheel A is transmitted inversely to the wheel B. In addition, as the spring 8 may be fixed to the chassis 1 by means of a shaft 9 it will transmit the shock received, after having restrained or absorbed it by its elasticity, to the wheels C and D, through the medium of the swing bar 6' of the axle rods 5" and 5'".

The swing bars 6 and 6' may be formed by springs and the result would be:

An absorption of the shock by:
1. The swing bar.
2. The central spring.
3. The opposite swing bar.

As a consequence when a shock is received by one wheel its repercussion is first transmitted to the wheel opposite and parallel to it and immediately afterwards to the pair of wheels at the other end of the vehicle, but is damped by the elasticity of the central spring 8 as well as by the swing bars 6 and 6'.

Consequently when an obstacle produces a shock the latter is transmitted regularly not to one wheel alone but to all four wheels of the vehicle and this takes place in an equal and balanced manner.

What I claim is:

1. A balanced chassis for use in connection with vehicles including a centrally disposed spring adapted to be mounted upon a chassis, a half shaft arranged at each end of said spring, swing bars pivotally connected to said half axles, axle rods connected at one end to the swing bars, vehicle wheels mounted upon the other ends of said axle rods, the latter being adapted to pass through bearings provided on a vehicle chassis.

2. A balanced chassis with independent suspension adapted for use on all types of vehicles whatever be the number of wheels provided upon the vehicle, comprising a central spring mounted on said chassis, a half shaft provided at each end of said spring, swing bars pivotally connected to said half axles, axle rods connected at one end to said swing bars, the wheels of the vehicle being mounted upon the other ends of said axle rods, said axle rods passing through bearings provided upon the chassis, and adapted to pivot in said bearings so that a force tending to raise one wheel is transmitted to the opposite and parallel wheel as a downward force, the force being damped by the said central spring and transmitted through the said rods and bars at the other end of said spring to the other wheels of the vehicle.

In testimony whereof I have signed my name to this specification.

YVON VAN MALDERGHEM.